May 5, 1931.  A. WRIGHT  1,803,450
DRYING APPARATUS
Filed June 12, 1926
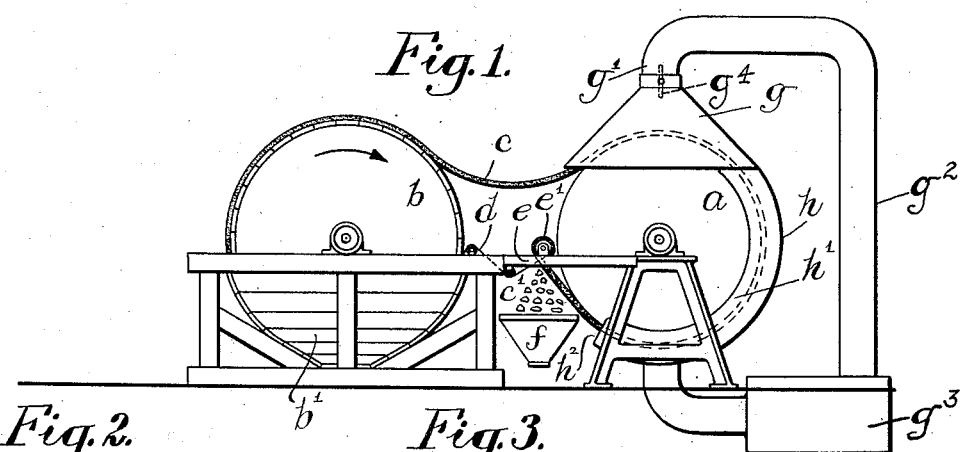
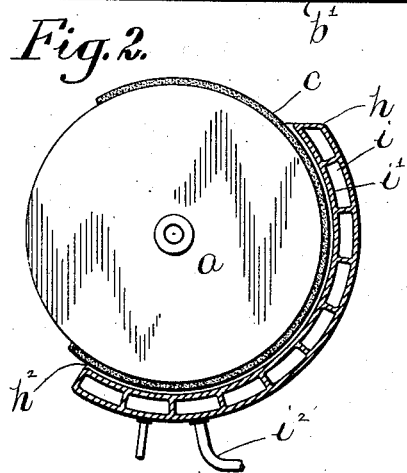
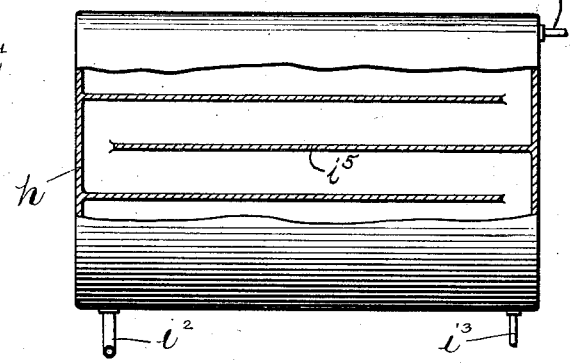
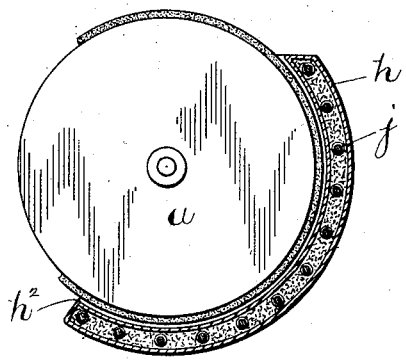
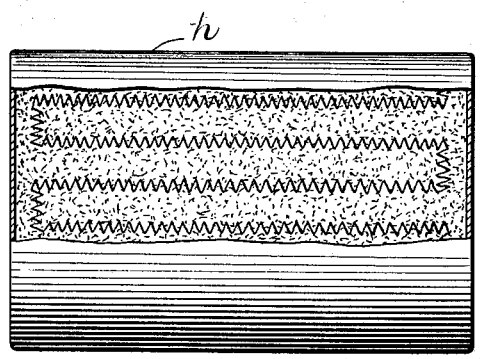
Inventor
ARTHUR WRIGHT
By his Attorneys.
Redding, Greeley, O'Shea & Campbell Patented May 5, 1931

1,803,450

UNITED STATES PATENT OFFICE

ARTHUR WRIGHT, OF UPPER MONTCLAIR, NEW JERSEY

DRYING APPARATUS

Application filed June 12, 1926. Serial No. 115,517.

This invention relates to improvements in drying devices and more particularly to devices wherein entrained moisture is removed from a cake or the like formed by the separation of solids from a liquid within which such solids have been suspended. It has especial reference to situations in which a rotary drum dryer is availed of as the drying medium for a filter cake formed on a continuous drum type filter and so re-enforced that the cake may be removed as a band or belt and carried into contact with a heated drum where the liquid is removed while the cake contacts with the heated drum and travels therewith about its axis. After leaving the drum the dried filter cake is stripped from the re-enforcement which returns again into contact with the filter. This method has been described and claimed broadly in the patent to Arthur Wright and Frank W. Young, No. 1,472,574, dated October 30, 1923, and a modification thereof involving a rotary drum dryer is disclosed in the co-pending application of Arthur Wright and Frank W. Young, No. 115,481, filed June 12, 1926.

One object of the present invention is the promotion of the circulation of fresh air or other gaseous medium in contact with the surface of a cake while drying upon the periphery of a drying drum and the expeditious removal of the products of evaporation therefrom. This is accomplished by conducting the cake during the step of drying within a housing or enclosure for the drum, or a portion of the peripheral surface thereof, and making provision for the introduction therein and the evacuation therefrom of gaseous medium. More particularly, such enclosure may conveniently consist in a curvilinear shield spaced from the peripheral surface of the heating drum to form a passage for the cake and extending from a vapor flue hood enclosing the top of the drum downwards about the drum to approximately the point of departure of the cake from the drum. If desired, the sides of the passage may be closed by side walls secured to the shield and overlying the ends of the drum. With such a construction fresh air or other gaseous medium may enter where the dried cake leaves the enclosure and may be exhausted up the vapor flue. Such a shield may also be found advantageous in limiting the degree of radiation of heat from the drying cake.

Another aspect of the invention has to do with an increase in the heat to which the cake on a rotary heating drum is subjected. Such added heat may be applied upon the surface of the cake remote from the peripheral surface of the drum. Accordingly, heating elements may be associated with the enclosure or shield for the drum by which the temperature of the passage for the belt of cake is raised. Such additional heat may be afforded by heating units or coils for a heated fluid medium disposed within the shield or within say the double walls of such a shield or the shield may take the form of a heating jacket into which steam, waste gas, hot air or other heated fluid medium may be introduced.

Fresh gaseous medium entering the enclosure and contacting with the moist heated cake becomes laden with the moisture to the extent permitted by its temperature. That is, its maximum moisture carrying capacity depends upon the saturation point for the temperature to which the gas is raised by its passage through the chamber. Raising the temperature of the gas, however, will desaturate it, as will be readily understood. A still further aspect of the invention, therefore, contemplates the recirculation of the gaseous medium and the desaturation thereof in circumstances where, for instance, it may be found desirable to take advantage of the initially higher temperature of the gas upon its recirculation or where the character of the gaseous medium has importance. To this end the moisture bearing and warmed gases may be conducted from the hood into contact with a heating medium and then back to the beginning of the heating passage for the cake.

In order that the invention may be clearly understood and readily carried into effect the same will now be described more fully with reference to the accompanying drawings, illustrating a preferred embodiment thereof, in which:

Figure 1 is a somewhat diagrammatic view, in side elevation, showing the invention applied to a rotary drum dryer associated with a continuous drum filter.

Figure 2 is an end view showing a dryer drum with the belt of cake contacting therewith and a jacket for the drum within which the belt travels, the jacket being illustrated as adapted for a fluid heating medium.

Figure 3 is a view looking from the right in Figure 2 and illustrating the jacket with a part removed to show baffles which may be availed of to effect the even distribution of the heating medium.

Figure 4 is a view similar to Figure 2 but showing the use of electric heating coils as the heating instrumentality.

Figure 5 is a view similar to Figure 3 showing one method of arranging electric heating coils in association with the drum enclosure.

While the invention has been illustrated and will hereinafter be described as applied to a rotary drum dryer $a$ associated with a continuous rotary type filter $b$ turning in the tank $b'$, of say, slurry, it is to be understood that it is not limited to such use, but is equally applicable in any situation wherein a cake $c$ formed from solids separated in any manner from a liquid in which they have been suspended and re-enforced by any type of re-enforcing medium $d$, such as, for instance, either an open mesh belt as shown in the patent or a plurality of spaced parallel and continuous strands encircling the filter and drying drum as shown in the application, is brought into contact, upon one surface, with a heated surface for the liberation of an entrained fluid medium. Thereafter the dried solids are stripped from the re-enforcing medium by suitable means, such as are indicated at $e$, which may take the form of a comb between the teeth of which the spaced strands pass, or beaters for use with a mesh belt re-enforcement or as illustrated in Figure 1 by looping the strands about a roll $e'$ whereby the passage of a portion of a strand which has been freed of filter cake between portions to which filter cake adheres causes a stripping of the dried cake, as at $c'$, which may be permitted to fall into a discharge hopper $f$. Roll $e'$ may be a grooved idler.

The drum $a$ may be heated interiorly in any convenient manner, say by steam, and the cake continuously conveyed from the filter is wrapped around the heated drum with sufficient tension to insure positive contact of the filter cake with the heated surface of the drum. The cake thickness is such as not to produce an appreciable insulation in order that the entire cake may be uniformly dried.

In some situations it may be found advantageous to prevent radiation of heat from the drying cake. It may also be found desirable in some circumstances to promote the circulation of air or other gaseous medium or an inert gas in proximity to the cake in process of drying in the interest of celerity of evaporation and the conveyance of the volatilized fluid away from the surface of the drying cake or to limit or define the action of the medium upon the cake. To this end a hood $g$ is disposed above the dryer drum $a$ whereby the products of evaporation are drawn upwardly and discharged through a flue shown in dotted lines at $g'$. In conjunction with the hood it is proposed to provide a jacket or housing for the drum. This may take the form of a casing completely enclosing the drum and having an inlet and an outlet for the belt of cake or it may, as illustrated in Figure 1 comprise a shield $h$ extending from the hood $g$ about the periphery of the drum to approximately the point where the belt of cake leaves the drum. If desired, sides $h'$ may contact with or overlap the ends of drum $a$ to form a substantially tight enclosure to prevent radiation and produce in effect a channel for the passage of the belt of cake and a counter-current of air or other gaseous medium which enters fresh at say $h^2$ and evacuates through the stack $g'$ carrying with it the moisture from the drying cake.

Instead of applying all of the heat to the cake solely from the drum $a$ which acts obviously upon the adjacent surface first and with greatest effect it is also proposed, according to one aspect of the invention, to apply heat to both surfaces simultaneously. This may be conveniently accomplished by incorporating with the shield $h$ a heating element. This may take the form of a chamber $i$ whereof the inner wall $i'$ is spaced from the periphery of the drum $a$ to provide a passage for the cake and the counter-current of air and which may be heated interiorly by the introduction through say the pipe $i^2$ of any fluid medium of relatively high temperature such as steam, waste gas, hot air or the like. To insure an even distribution of the fluid over the entire surface of the wall $i'$ baffles $i^5$ are shown so disposed within the chamber as to direct the fluid over a circuitous course. Provision may be made for the escape of water of condensation through a pipe, say $i^3$, and in the event of the use of waste gas, for instance, an outlet $i^4$ may be provided near the topmost portion of the chamber.

Electric heating coils $j$ may also be availed of as the heating instrumentality associated with the casing $h$. These may be disposed within a double wall forming the casing as illustrated in Figures 4 and 5 or they may simply be secured to the inner surface of a single wall as may also steam coils or the like be secured.

The air originally entering the enclosure not only carries considerable moisture upon leaving but its temperature has been raised due to its contact with the heated cake on the drum and, when present, with the heating means associated with the shield. In some situations it may be found desirable to conserve this heat, in which event the moisture carrying air from the stack $g'$ may be returned to the entrance $h^2$ for further contact with the cake. Of course, the air at this point may be saturated for that temperature but even so, as is well known, raising the temperature of the air will increase its moisture carrying capacity. The warm air from the stack $g'$ may, therefore, be made capable of carrying a still greater quantity of moisture by subjecting it to additional heating during its return to the entrance $h^2$. In lieu, therefore, of exhausting all of the products of evaporation into the atmosphere through the stack $g'$, a conduit $g^2$ may be provided leading from the hood $g$ to a heating element $g^3$ and through the heating element $g^3$ back to the shield $h$ adjacent the entrance $h^2$.

One of the important features in evaporation is, of course, the rate of flow of the gaseous medium over the moisture containing mass. As a further means of controlling the evaporation of moisture from the cake, a damper $g^4$ may, if desired, be disposed in the outlet of the vapor hood.

By the construction described a rotary drum type dryer is provided wherein the heat loss by evaporation is reduced to a minimum and a better control of the heating and hence of moisture content is afforded, it having been found in practice that the moisture content of the dried cake has been reduced materially where the heat has been applied to both outer and inner surfaces of the cake as described.

Various modifications may be made in the form of the housing, the degree of enclosure afforded the periphery of the dryer drum and the presence or absence of heating units and the character thereof may be varied without departing from the spirit and scope of the invention in its numerous aspects.

What I claim is:

In combination, a rotary drum dryer, a re-enforcing medium to conduct a moisture containing mass into contact with the drum, a housing for the drum allowing ingress and exit for the re-enforcing medium, means of ingress and exit for a gaseous medium, means to conduct the gaseous medium from the last named exit, means to the last named means of ingress, and heating means for said gaseous medium between said means of ingress and exit last mentioned.

This specification signed this 7th day of June, A. D. 1926.

ARTHUR WRIGHT.